United States Patent [19]
Hiramoto et al.

[11] Patent Number: 5,905,353
[45] Date of Patent: *May 18, 1999

[54] METHOD AND APPARATUS OF DRIVING STEPPING MOTOR

[75] Inventors: Michiya Hiramoto; Hiroyuki Simizu, both of Atsugi, Japan

[73] Assignee: Unisia Jecs Corporation, Atsugi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/712,216

[22] Filed: Sep. 11, 1996

Related U.S. Application Data

[63] Continuation of application No. 08/394,305, Feb. 24, 1995, abandoned.

[30] Foreign Application Priority Data

Feb. 25, 1994 [JP] Japan ..................................... 6-028278

[51] Int. Cl.$^6$ ...................................... H02P 8/00
[52] U.S. Cl. .............................. 318/696; 318/599; 363/41
[58] Field of Search ..................................... 318/685, 696, 318/599, 480, 561, 138, 254; 363/41, 98, 132, 52; 388/811

[56] References Cited

U.S. PATENT DOCUMENTS

| | | | |
|---|---|---|---|
| 4,107,595 | 8/1978 | Campe | 318/696 |
| 4,218,642 | 8/1980 | Johnson | 318/696 |
| 4,473,786 | 9/1984 | Miyashita et al. | 318/561 |
| 4,571,530 | 2/1986 | Sweeney, Jr. | 318/594 |
| 4,698,567 | 10/1987 | Gottwald et al. | 318/480 |
| 4,760,316 | 7/1988 | Hedlund | 318/254 |
| 4,959,601 | 9/1990 | Kikugawa | 318/696 |
| 5,182,507 | 1/1993 | Ishii et al. | 318/685 |
| 5,247,235 | 9/1993 | Tu et al. | 318/685 |
| 5,310,027 | 5/1994 | Nakamura et al. | 188/299 |

FOREIGN PATENT DOCUMENTS

| | | |
|---|---|---|
| 40 02 158 | 8/1991 | Germany . |
| 42 26 051 | 2/1993 | Germany . |
| 5-193327 | 8/1993 | Japan . |

OTHER PUBLICATIONS

Patent Abstracts of Japan, vol. 11 No. 36, Feb. 3, 1987, JP 61–203896.

Patent Abstracts of Japan, vol. 11 No. 148, May 14, 1987, JP 61–285099.

*Primary Examiner*—John W. Cabeca
*Attorney, Agent, or Firm*—Foley & Lardner

[57] ABSTRACT

A method of driving a stepping motor comprises providing a chopping signal to a drive current of the stepping motor when a chopping condition is on, and synchronizing output of the chopping signal with output of a drive signal for driving stepwise the stepping motor.

14 Claims, 4 Drawing Sheets

METHOD AND APPARATUS OF DRIVING STEPPING MOTOR

This application is a continuation of application Ser. No. 08/394,305, filed Feb. 24, 1995, now abandoned.

BACKGROUND OF THE INVENTION

The present invention relates to a method of driving a stepping motor and more particularly, to a technique of restraining vibration of the stepping motor during drive thereof.

Conventionally, the stepping motor is used in an automotive suspension system disclosed, for example, in JP-A 5-193327.

A variable-damping-force-type shock absorber used in the automotive suspension system includes a rotary valve having changeable damping force characteristic, and a stepping motor mounted at an upper end of the shock absorber so as to rotate the rotary valve.

However, the conventional variable-damping-force-type shock absorber has the following inconvenience:

When driving stepwise the stepping motor, drive current is always turned on, i.e. in the continuous turn-on state, actual current input to the stepping motor is heavy, and thus drive torque is great. As a result, great vibration noise is produced upon drive of the stepping motor, which may cause a seat occupant to have a strange feel upon low-speed cruising or standstill of a motor vehicle in particular.

It is, therefore, an object of the present invention to provide a method of driving a stepping motor which contributes to a restraint of generation of vibration during drive thereof.

SUMMARY OF THE INVENTION

According to one aspect of the present invention, there is provided a method of driving a stepping motor, the stepping motor inputting a drive current, the method comprising the steps of:

providing a chopping signal to the drive current of the stepping motor when a chopping condition is on, said chopping signal producing a discontinuous turn-on of the drive current; and synchronizing output of said chopping signal with output of a drive signal for driving stepwise the stepping motor.

Another aspect of the present invention lies in providing, in a motor vehicle:

a shock absorber including means for allowing change in damping force; and a stepping motor mounted to said shock absorber at one end thereof, said stepping motor serving to rotate said change allowing means of said shock absorber, said stepping motor inputting a drive current and being driven in accordance with a method comprising the steps of:

providing a chopping signal to said drive current of said stepping motor when a chopping condition is on, said chopping signal producing a discontinuous turn-on of said drive current; and synchronizing output of said chopping signal with output of a drive signal for driving stepwise said stepping motor.

DETAILED DESCRIPTION OF THE INVENTION

Figure 3:
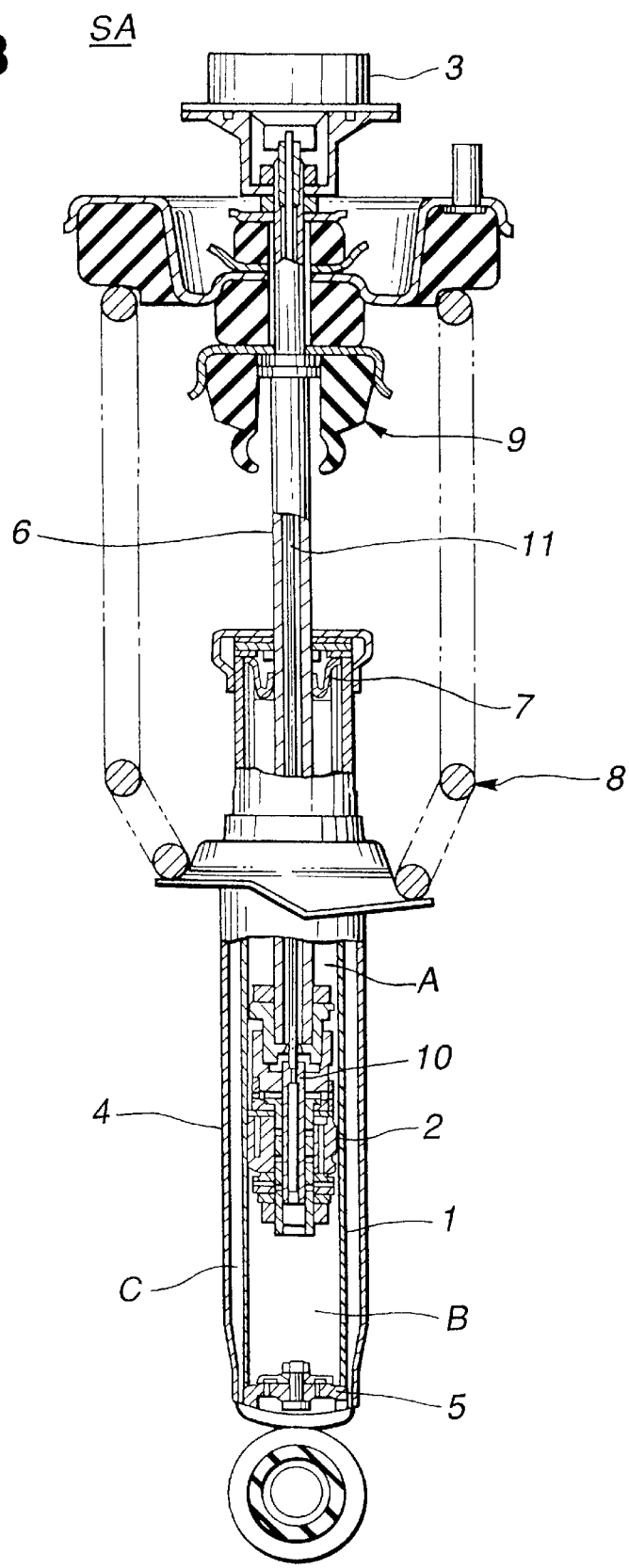
FIG. 3 is a diagrammatic sectional view showing a variable-damping-force-type shock absorber to which the present invention is applied.

Referring to FIG. 3, there is shown a variable-damping-force-type shock absorber for a motor vehicle, generally designated by SA, to which a method of driving a stepping motor according to the present invention is applied.

The shock absorber SA includes a cylinder 1, a piston 2 serving to define an upper chamber A and a lower chamber B of the cylinder 1, an outer tube 4 serving to form a reservoir chamber C at the outer periphery of the cylinder 1, a base 5 serving to define the lower chamber B and the reservoir chamber C, a guide member 7 serving to slidably guide a piston rod 6 connected to the piston 2, a suspension spring 8 interposed between the outer tube 4 and a vehicular body (not shown), and a bumper rubber 9. Moreover, the shock absorber SA includes a rotary valve 10 having changeable damping force characteristic arranged within the piston rod 6, and a stepping motor 3 mounted at an upper end of the shock absorber SA so as to rotate the rotary valve 10 through a control rod 11.

Figure 1:
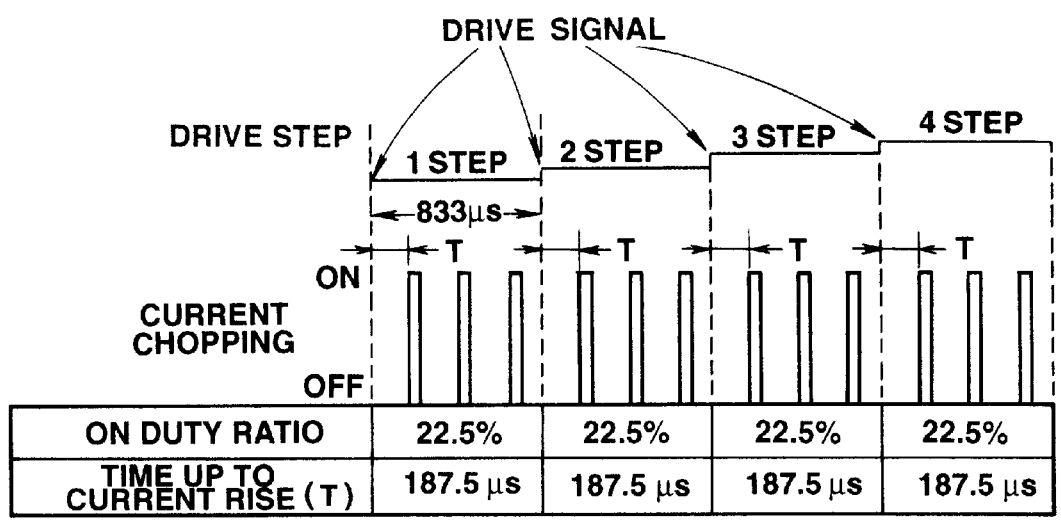
FIG. 1 is a time chart showing a method of driving a stepping motor according to the present invention.
Figure 2:
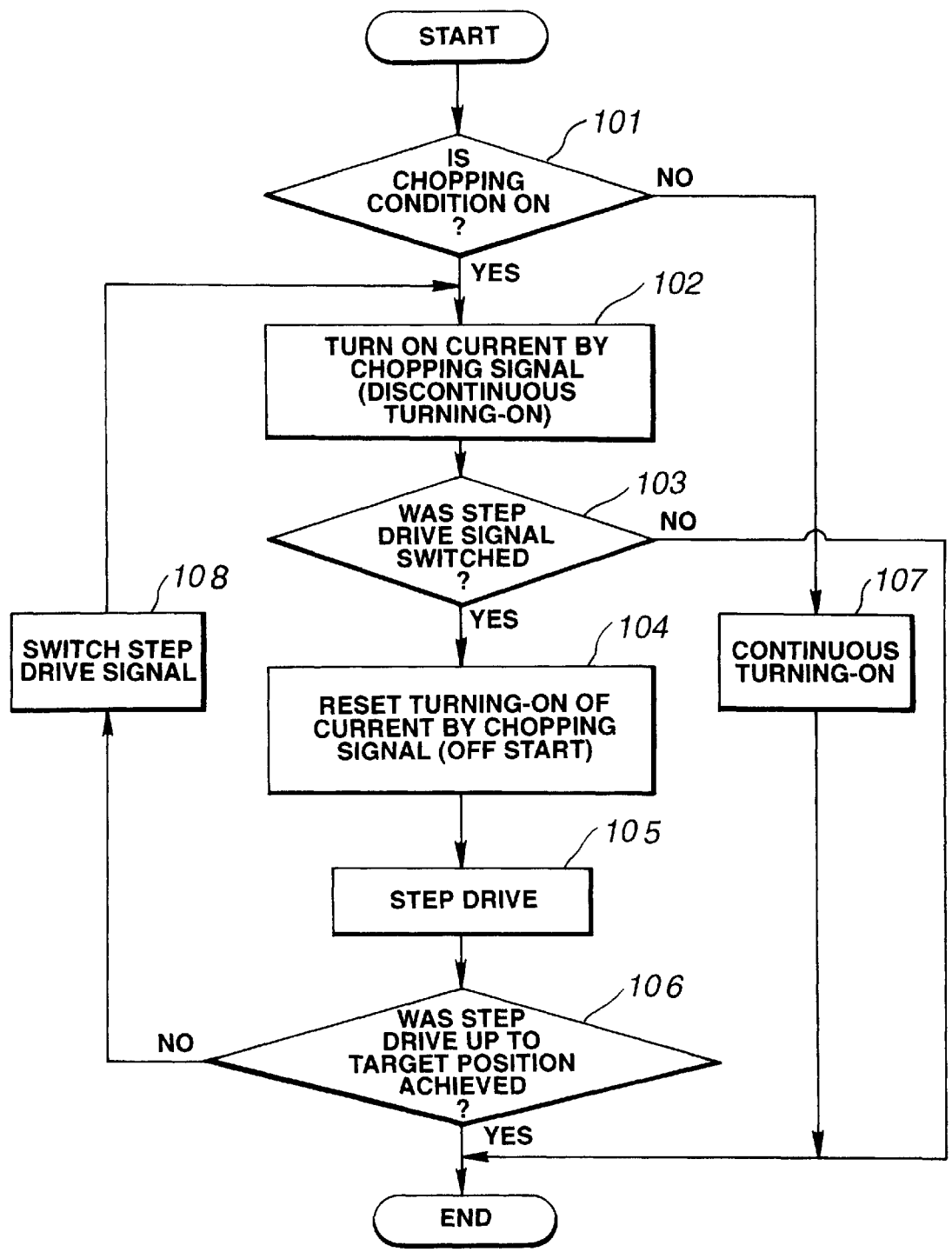
FIG. 2 is a flowchart showing an operation of the method of driving a stepping motor.

Referring next to FIGS. 1 and 2, a method of driving stepwise a stepping motor according to the present invention will be described.

Referring to FIG. 2, at a step 101, it is determined whether or not a chopping condition is on. It is noted that the chopping condition is on upon low-speed cruising or standstill of the motor vehicle. If the answer at the step 101 is YES, control proceeds to a step 102 where switching is carried out to the current turn-on state with a chopping signal, i.e. the discontinuous current turn-on state, then, control proceeds to a step 103. On the other hand, if the answer at the step 101 is NO, control proceeds to a step 107 where switching is carried out to the continuous current turn-on state, then, control comes to an end.

At the step 103, it is determined whether or not a drive signal of the stepping motor 3 was switched. If the answer at the step 103 is YES, control proceeds to a step 104 where current turn-on with a chopping signal is reset to have the off-start state. After a lapse of a predetermined period of time T, at a subsequent step 105, the stepping motor 3 is driven stepwise by current turn-on with a chopping signal, i.e. discontinuous current turn-on. On the other hand, if the answer at the step 103 is NO, control comes to an end.

At a step 106 subsequent to the step 105, it is determined whether or not the stepping motor 3 was driven stepwise up to a target position. If the answer at the step 106 is YES, control comes to an end, whereas if the answer at the step 106 is NO, control proceeds to a step 108 where switching of a drive signal is carried out to drive the stepping motor 3 by one more step, then, control returns to the step 102.

According to the method of the present invention, referring to FIG. 1, drive current for driving the stepping motor 3 is chopped upon low-speed cruising or standstill of the motor vehicle so as to decrease an actual current value. This enables a reduction in drive torque of the stepping motor 3, restraining vibration of the stepping motor 3 during drive thereof, resulting in a reduced noise level transmitted in a vehicular room.

Further, output of a chopping signal is synchronized with that of a drive signal for driving stepwise the stepping motor 3. Thus, a period of time from a point that a drive signal is output to a point that a chopping signal is reset in the turn-off state can be constant, having no potential difference between drive steps in a ratio of a current turn-on time, i.e. an on-duty ratio. This can prevent generation of noise due to a dispersion of a vibration level of the stepping motor 3 during drive thereof, resulting in a further reduction in a noise level.

Furthermore, upon output of a drive signal for driving stepwise the stepping motor 3, chopping current is first reset in the turn-off state or put in the off-start state, then synchronized with a drive signal to be turned on after a predetermined period of time T. This contributes to a reduction in the number of chopping signals, enabling a further reduction in drive torque of the stepping motor 3, resulting in a further reduced vibration level thereof.

Figure 4:
FIG. 4 is a waveform chart showing vibration waveforms of a stepping motor when driven stepwise in accordance with the method of the present invention.

Referring to FIG. 4, there is shown vibration waveforms of the stepping motor 3 when driven stepwise in accordance with a flow as shown in FIG. 2. These waveforms correspond to waveforms of acceleration G in the direction of rotation of the stepping motor 3. In FIG. 4, a broken line indicates a vibration waveform in the continuous current turn-on state, and a fully-drawn line indicates a vibration waveform in the discontinuous current turn-on state with a chopping signal. It will be understood from FIG. 4 that the vibration waveform in the discontinuous current turn-on state with a chopping signal is stabilized at a lower level as compared with that in the continuous current turn-on state.

Figure 5:
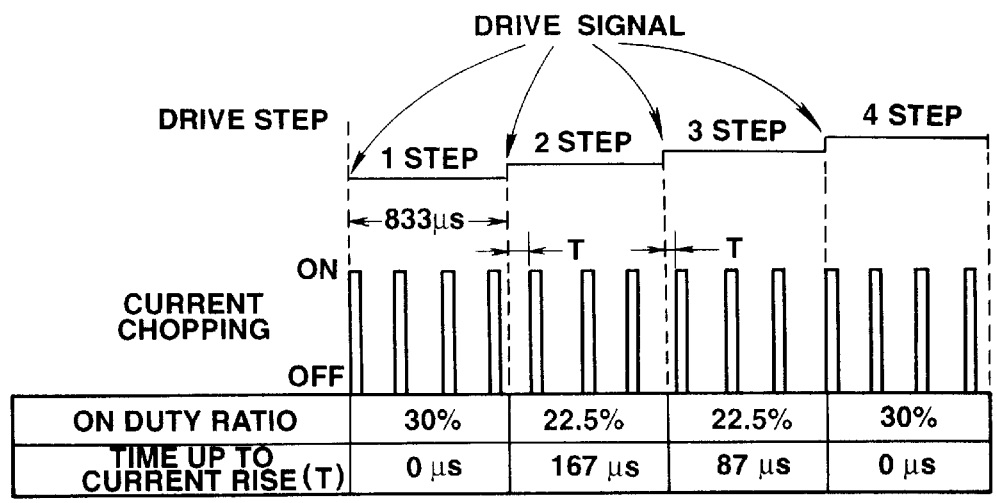
FIG. 5 is a view similar to FIG. 1, showing a method of driving a stepping motor when a chopping signal is not synchronized with a drive signal.
Figure 6:
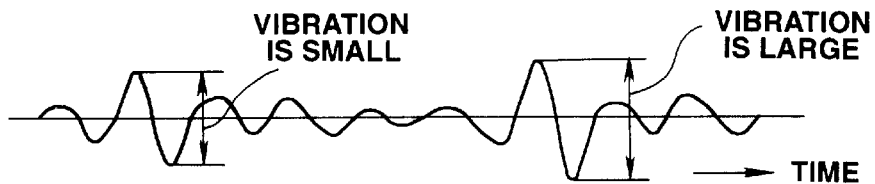
FIG. 6 is a view similar to FIG. 4, showing vibration waveforms of the stepping motor when driven stepwise in accordance with the method in FIG. 5.

Referring to FIG. 5, there is shown a method of driving a stepping motor when a chopping signal is not synchronized with a drive signal. According to this method, there is a difference between the drive steps in the period of time T from a point that a drive signal is output to a point that a chopping signal is turned on. As a result, a potential difference is produced between the drive steps in a ratio of a current turn-on time, i.e. an on-duty ratio. This produces a dispersion of a vibration level of the stepping motor 3 during drive thereof, so that, referring to FIG. 6, a vibration waveform of the stepping motor 3 when driven stepwise cannot be stabilized at a low level.

Having described the present invention in connection with the preferred embodiment, the present invention is not limited thereto, and various changes and modifications are possible without departing from the spirit of the present invention.

By way of example, in this example, chopping current is put in the off-start state. Alternatively, chopping current may be put in the on-start state.

What is claimed is:

1. A method of driving a stepping motor, the stepping motor being driven stepwise by a drive current when receiving a step drive signal, the method comprising the steps of:

determining whether a chopping condition for the stepping motor is on;

providing a chopping signal to the drive current when the chopping condition is on, said chopping signal producing a discontinuous turn-on of the drive current, said chopping signal being in a form of a pulse having a constant width and repeated at a first predetermined period of time;

resetting said chopping signal upon reception of a next occurrence of the step drive signal; and synchronizing said chopping signal so that said chopping signal starts at a second predetermined period of time after the reception of the next occurrence of the step drive signal, to synchronize output of said chopping signal with output of the step drive signal.

2. A method as claimed in claim 1, wherein said resetting step comprises:

turning said chopping signal off upon output of the next occurrence of the step drive signal; and turning said chopping signal on after a lapse of the second predetermined period of time.

3. A method as claimed in claim 2, wherein said resetting step comprises:

turning said chopping signal on upon output of the next occurrence of the step drive signal; and turning said chopping signal off after a lapse of the second predetermined period of time.

4. A method as claimed in claim 1, wherein a time period between two successive occurrences of the step drive signal is longer than the first predetermined period of time.

5. A vehicle, comprising:

a shock absorber including means for allowing change in damping force; and a stepping motor mounted to said shock absorber at one end thereof, said stepping motor serving to rotate said change allowing means of said shock absorber, said stepping motor being driven stepwise by a drive current when receiving a step drive signal and in accordance with a method comprising the steps of:

determining whether a chopping condition for the stepping motor is on;

providing a chopping signal to the drive current when the chopping condition is on, said chopping signal producing a discontinuous turn-on of the drive current, said chopping signal being in a form of a pulse having a constant width and repeated at a first predetermined period of time;

resetting said chopping signal upon reception of a next occurrence of the step drive signal; and synchronizing said chopping signal so that said chopping signal starts at a second predetermined period of time after the reception of the next occurrence of the step drive signal, to synchronize output of said chopping signal with output of said step drive signal.

6. A vehicle as claimed in claim 5, wherein a time period between two successive occurrences of the step drive signal is longer than the first predetermined period of time.

7. A vehicle as claimed in claim 5, wherein said resetting step comprises:

turning said chopping signal off upon output of the next occurrence of said step drive signal; and turning said chopping signal on after a lapse of the second predetermined period of time.

8. A vehicle as claimed in claim 7, wherein said resetting step comprises:

turning said chopping signal on upon output of the next occurrence of said step drive signal; and turning said chopping signal off after a lapse of the second predetermined period of time.

9. A method of driving a stepping motor to affect a damping force of a shock absorber in a vehicle, comprising the steps of:
   a) determining if a chopping condition exists based upon a vehicle speed of the vehicle;
   b) if the chopping condition exists, turning on a discontinuous current to the stepping motor;
   c) determining if a step drive signal of the stepping motor switches from a first state to a second state;
   d) if the determination in step c) is that the step drive signal of the stepping motor switched, delaying for a first predetermined period of time and thereafter driving the stepping motor with a chopping signal, the chopping signal being in a form of a pulse having a constant width and repeated at a second predetermined period of time;
   e) determining if the stepping motor reaches a target position;
   f) if the determination in step e) is that the stepping motor reached the target position, terminating control of the stepping motor; and
   g) if the determination in step e) is that the stepping motor did not reach the target position, switching the state of the step drive signal, resetting the chopping signal, and returning to step b).

10. A method as claimed in claim 9, wherein a time period between two successive occurrences of the step drive signal is longer than the second predetermined period of time.

11. A method as claimed in claim 10, wherein the chopping condition is determined to be on when the vehicle is traveling at a speed less than a fixed speed.

12. A vehicle, comprising:
a shock absorber including a rotary valve; and
a stepping motor mounted to said shock absorber at one end thereof, said stepping motor serving to rotate said rotary valve of said shock absorber, said stepping motor being driven stepwise by a drive current when receiving a step drive signal and in accordance with a method comprising the steps of:
   determining whether a chopping condition for the stepping motor is on;
   providing a chopping signal to the drive current when the chopping condition is on, said chopping signal producing a discontinuous turn-on of the drive current, said chopping signal being in a form of a pulse having a constant width and repeated at a first predetermined period of time;
   resetting said chopping signal upon reception of a next occurrence of the step drive signal; and
   synchronizing said chopping signal so that said chopping signal starts at a second predetermined period of time after the reception of the next occurrence of the step drive signal, to synchronize output of said chopping signal with output of said step drive signal.

13. A vehicle as claimed in claim 12, wherein a time period between two successive occurrences of the step drive signal is longer than the first predetermined period of time.

14. A vehicle as claimed in claim 13, wherein the chopping condition is determined to be on when the vehicle is traveling at a speed less than a fixed speed.

* * * * *